United States Patent
Berthe et al.

(10) Patent No.: US 9,234,793 B2
(45) Date of Patent: Jan. 12, 2016

(54) AUTOMATICALLY ADJUSTABLE SPATIAL ANALYZER FOR A LASER BEAM

(75) Inventors: Laurent Berthe, Bourg la Reine (FR); Matthieu Schneider, Paris (FR); Marco Soscia, Poisy (FR)

(73) Assignee: Centre National De La Recherche Scientifique, Paris (FR)

( * ) Notice: Subject to any disclaimer, the term of this patent is extended or adjusted under 35 U.S.C. 154(b) by 0 days.

(21) Appl. No.: 14/111,644

(22) PCT Filed: Apr. 13, 2012

(86) PCT No.: PCT/EP2012/056790
§ 371 (c)(1),
(2), (4) Date: Dec. 30, 2013

(87) PCT Pub. No.: WO2012/140203
PCT Pub. Date: Oct. 18, 2012

(65) Prior Publication Data
US 2014/0118724 A1   May 1, 2014

(30) Foreign Application Priority Data
Apr. 14, 2011 (FR) .................................... 11 53265

(51) Int. Cl.
*G01J 1/42* (2006.01)
*G01J 1/04* (2006.01)
(52) U.S. Cl.
CPC ................ *G01J 1/4257* (2013.01); *G01J 1/04* (2013.01); *G01J 1/0411* (2013.01); *G01J 1/0448* (2013.01); *G01J 1/4228* (2013.01)

(58) Field of Classification Search
None
See application file for complete search history.

(56) References Cited

U.S. PATENT DOCUMENTS

| 4,915,500 | A * | 4/1990 | Selkowitz ..................... 356/221 |
| 2010/0047058 | A1* | 2/2010 | Mitra et al. ................... 415/118 |
| 2010/0253937 | A1 | 10/2010 | Zerl et al. |
| 2012/0229622 | A1* | 9/2012 | Goldberg et al. ............. 348/135 |

FOREIGN PATENT DOCUMENTS

EP   2037238 A1   3/2009

OTHER PUBLICATIONS

"Parameter Fest IM Grifr", Elektrotechnik, Sep. 1991, vol. 73, No. 9, pp. 23-24.

* cited by examiner

*Primary Examiner* — Gordon J Stock, Jr.
(74) *Attorney, Agent, or Firm* — Baker & Hostetler LLP

(57) ABSTRACT

An analyzer of the spatial intensity distribution of a laser beam focused or transmitted by an optical fiber comprises: a shaping lens; a device for taking a partial sample of the beam; a heat sink; a photodiode; an imaging lens to form images of the plane on an image sensor; a motorization of the shaping lens to translate along the optical axis; a motorization of the imaging lens to translate in a plane perpendicular to the optical axis; a motorization of the image sensor to translate along the optical axis; an electronic unit controlling each motorization; an electronic unit synchronizing the image sensor, connected to the photodiode to synchronize image capture with the laser pulses or in the pulses; an electronic unit adjusting the aperture and/or gain of the image sensor; and a software interface parameterizing and piloting the electronic control units, equipped with an image processing unit.

5 Claims, 2 Drawing Sheets

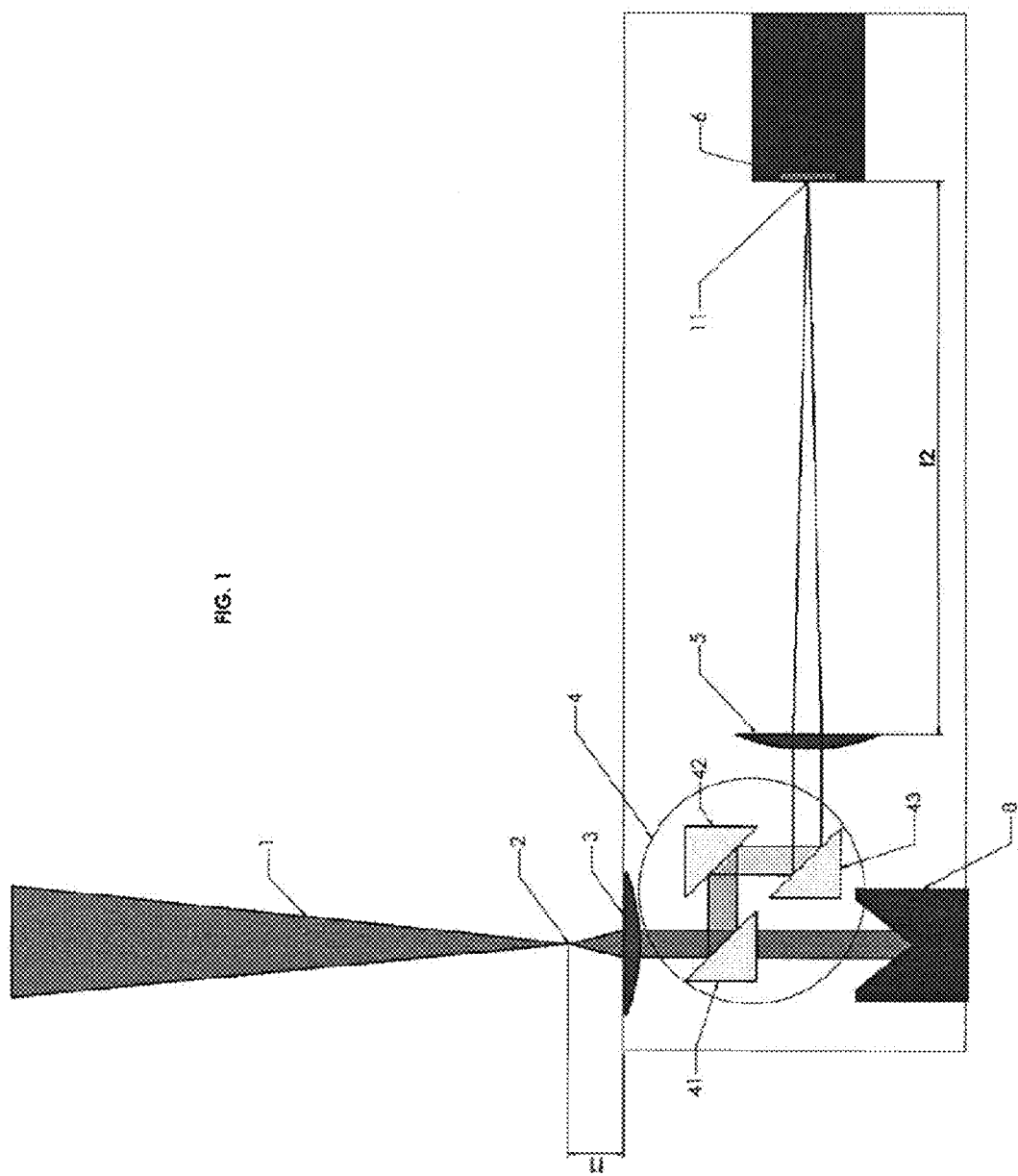

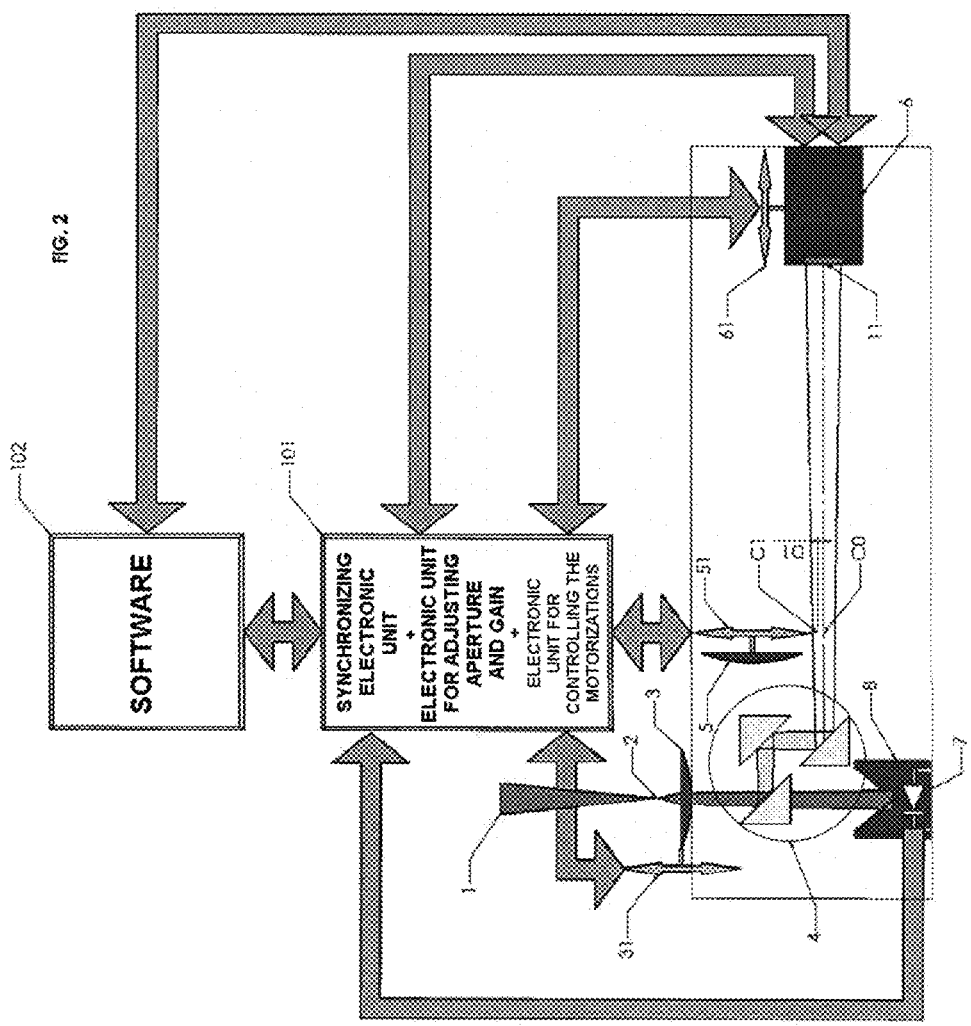

AUTOMATICALLY ADJUSTABLE SPATIAL ANALYZER FOR A LASER BEAM

CROSS-REFERENCE TO RELATED APPLICATIONS

This application is a National Stage of International patent application PCT/EP2012/056790, filed on Apr. 13, 2012, which claims priority to foreign French patent application No. FR 1153265, filed on Apr. 14, 2011, the disclosures of which are incorporated by reference in their entirety.

FIELD OF THE INVENTION

The field of the invention is that of the laser-beam analyzers used to analyze the spatial intensity distribution $Iz(x,y)$ or energy distribution $Ez(x, y)$ of a focused pulsed laser beam. With these systems the image of a laser beam is formed and analyzed in a plane (x, y) perpendicular to the axis of its optical path after focusing.

BACKGROUND

These analyzers are used in all sectors of activity: industrial, medical, food processing, etc., and concern all focused laser sources, already developed and being developed, that require complete characterization, and all the applications of focused laser treatments, among which mention may be made of:
- drilling (percussion, trepanning),
- welding,
- cutting,
- cladding,
- fritting,
- peening (imparting stress to a surface, destructive testing, adhesion testing, etc.),
- surface treatment (cleaning, melting, etc.),
- engraving or etching,
- etc.

Pulsed laser beam analysis is critical for evaluating laser irradiation conditions in the focal plane and on either side of the focal plane. These parameters are generally designated as follows:
- the diameter of the beam approximated as a circular, elliptical, square, rectangular, etc. spot,
- the intensity distribution over the zone irradiated by the laser,
- the divergence of the focused beam (caustic focus),
- the frequency: number of laser pulses per second,
- the length of the pulses,
- the temporal shape of the pulses,
- the energy per pulse,
- the peak power in the pulse,
- the average power of the laser,
- fluctuations pulse to pulse or in a train of pulses.

At the present time no analyzer capable of extracting all of these parameters in the focal plane and on either side of the focal plane exists. In addition, existing instruments are confronted with difficulties with flux resistance (50 kW peak power), and with signal saturation at incident power densities above the saturation levels of the CCD or CMOS sensors used. As sensor saturation levels are about 0.5 µJ/cm² at a wavelength of 1.064 µm, devices for sampling a portion of the beam are required to analyze it, and additional attenuators may also be required depending on the incident power density. In addition to being bulky, the attenuators used degrade the optical quality of the beam, making their use very debatable.

FIG. 1 shows a conventional analyzer designed to analyze focused laser beams. It comprises:
- a convergent lens 3 called the shaping lens, of focal length f1, the object focal point of which must be placed in the focal plane 2 of the beam 1 to be analyzed,
- a sampling and/or attenuating device 4 represented here by 3 prisms 41, 42, 43,
- a device for absorbing energy, in this case a heat sink 8 (also designated a thermal joule meter) intended to absorb the unsampled beam, i.e. as much as more than 99.995% of the beam 1 to be analyzed,
- a convergent lens 5, called the imaging lens, of focal length f2, which forms the image 11 of the beam at the focal plane 2 on the analyzing sensor 6, and which defines the magnification (f2/f1) applied when measuring the diameter of the focal plane: $\text{Ø}focal = \text{Ø}sensor \times (f1/f2)$. A telescope may also be associated with this imaging lens, in order to increase magnification in the case where the laser beam to be analyzed has a small diameter (a few tens of microns),
- a camera for analyzing images and therefore spatial energy distribution $Ez(x,y)$: it is typically equipped with a CMOS or (windowless, in order to avoid problems with interference) CCD sensor 6 placed in the focal plane of the imaging lens 5.

Prior to analysis of the beam, the shaping and imaging lenses 3, 5 are correctly positioned in order to guarantee measurement of the diameter of the image 11 of the beam obtained on the sensor 6. Manual adjustment of these lenses is difficult, and risks damaging the components of the device. Specifically, it is possible to accidentally focus the laser beam on internal components of the system, which may damage or destroy them despite the attenuation provided.

Furthermore, with a pulsed laser it is necessary to synchronize image capture with the incident laser pulses. This synchronization may be achieved if the laser has a "TRIGGER" output. However this operation may be expensive or even impossible, in certain cases, to implement.

All of these constraints mean that current beam analyzers are bulky, difficult to use, and fragile with respect to power density, or are even incapable of analyzing, for high-power laser beams (1 to 50 kW peak for a pulsed laser), all of the aforementioned characteristics.

SUMMARY OF THE INVENTION

The aim of the invention is to remedy these drawbacks.

More precisely one subject of the invention is an analyzer for analyzing the spatial intensity distribution of a focused pulsed laser beam in a focal plane, which comprises downstream of this plane and on the optical path:
- a shaping lens,
- a device for partially sampling the shaped beam,
- a heat sink (also designated a thermal joule meter) intended to absorb the unsampled beam,
- a photodiode, and
- an imaging lens able to form images of the plane on an image sensor.

It is mainly characterized in that it comprises:
- a motorization of the shaping lens able to translate this lens along the axis of the optical path,
- a motorization of the imaging lens able to translate this lens in a plane perpendicular to the axis of the optical path, a motorization of the image sensor able to translate this sensor along the axis of the optical path, an electronic unit for controlling each motorization, an electronic unit for synchronizing the image sensor, which electronic unit is connected to the photodiode in order to synchronize image capture with the laser pulses or in the pulses, an electronic unit for adjusting the aperture and/or the gain of the image sensor, and a software interface for parameterizing and piloting the controlling, synchronizing and adjusting electronic units, which software interface is equipped with a unit for processing the images acquired by the sensor.

The invention also relates to a method for analyzing the spatial intensity distribution of a focused pulsed laser beam, in a plane perpendicular to the axis of the optical path of the beam, by means of an analyzer such as described, which comprises the following steps:

measuring, by means of the photodiode and the software interface, the period separating two pulses and the average length of these pulses, triggering image capture by the sensor with the synchronizing electronic unit as a function of this period and this length, and measuring the spatial intensity distribution of the one or more captured images.

Image capture may be triggered at a chosen moment during the length of the pulse.

According to one feature of the invention, the analyzing method comprises a step of calibrating the photodiode in absolute energy relative to the heat sink.

BRIEF DESCRIPTION OF THE DRAWINGS

Other features and advantages of the invention will become apparent on reading the following detailed description given by way of nonlimiting example, and with reference to the appended drawings, in which:

FIG. 1, described above, schematically shows an example beam analyzer according to the prior art, and FIG. 2 schematically shows an example beam analyzer according to the invention.

From one figure to the other, the same elements are designated by the same references.

DETAILED DESCRIPTION

A beam analyzer according to the invention and its adjusting method will now be described with reference to FIG. 2.

According to the invention the positions of the shaping lens 3 and of the imaging lens 5, and that of the sensor 6, are motorized and automatically controlled to obtain, on the sensor, the best possible image 11 of the beam to be analyzed in its focal plane 2.

More precisely, the shaping lens 3 is associated with a motorization 31 able to translate it along the axis of the optical path, this motorization 31 being piloted by a first electronic control unit, itself piloted by a software interface 102. The imaging lens 5 is associated with a motorization 51 able to translate it in a plane perpendicular to the axis of the optical path; this motorization 51 is piloted by a second electronic control unit, itself piloted by the software interface 102. Lastly, the sensor 6 is associated with a motorization 61 able to translate it along the axis of the optical path; this sensor 6 is piloted by a third electronic control unit, itself piloted by the software interface 102. These three electronic control units are preferably integrated into the electronic unit 101. An electromechanical or electronic stop may be provided on each of these three motorized axes, this stop allowing an origin and an initial direction to be defined for each of the translations, via transmission of corresponding signals to the electronic control units.

The positions of these three components 3, 5 and 6 are adjusted in the following way.

In a first step, it is sought to position the shaping lens 3 so that the plane 2 of the beam to be analyzed coincides with the object focal plane of this lens 3, i.e. to position the lens 3 a distance f1 from the plane 2.

For this purpose, the position of the shaping lens 3 is piloted to approximately a distance d1 from the object focal plane to be analyzed, d1 being smaller than the focal length f1 of the shaping lens 3 in order to ensure that a divergent beam, which will not damage the internal components of the analyzer, is obtained.

The position of the imaging lens 5 is piloted so that this lens is retracted from the optical path, in a plane perpendicular to the optical path. An image of the divergent beam is thus formed on the CCD or CMOS sensor 6. The lens 5 may be retracted before the preceding step.

For a given position of the shaping lens 3, the sensor 6 is also piloted to move along the optical path, over a distance of a few cm, in order to verify that a collimated beam is being approached until the latter is obtained.

More precisely, for a position d1 of the lens 3 where d1<f1:

A) the sensor 6 being positioned at a position P11, by means of its motorization 61, a characteristic of the image of the beam, such as its diameter $\Phi 11$ (or its intensity or energy distribution E11(x,y), etc.) is measured by the software interface 102, which comprises a unit for processing the images acquired by the sensor 6, B) then the sensor 6 being positioned at a position P12, a characteristic of the image of the beam, such as its diameter $\Phi 12$ (or its intensity or energy distribution E12(x,y), etc.) is measured, C) $|\Phi 11-\Phi 12|$ is calculated and compared to a preset threshold, or the intensity or energy distributions inter alia are compared to a preset threshold, D) provided that this threshold is not reached, steps A) to C) are reiterated for a new position d2 of the lens 3 (where d2<d1) achieved by means of its motorization 31, with which new positions P21 and P22 of the sensor and new characteristics, such as new diameters $\Phi 21$ and $\Phi 22$ or new intensity or energy distributions, are associated.

E) The beam is considered to be collimated, and therefore the shaping lens 3 is considered as being correctly positioned (plane to be observed located at the object focal point of the lens 3) once this threshold is reached. This threshold is typically equal to 0 or about 0.

Once the collimating operation has been completed, the imaging lens 5 is repositioned in the plane perpendicular to the axis of the optical path. In order to ensure it is perfectly centered on the axis of the optical path of the collimated beam, i.e. on C0, the following procedure is used. The preceding image of the collimated beam, stored in memory by the unit for processing acquired images, is superposed on the image currently formed on the sensor 6, using, for example, an image position comparison algorithm: the positions coincide when the lens 5 is centered. More precisely:

A) the position (x,y) of the image of the collimated beam formed on the sensor 6, after the collimation process has been completed, is determined by means of the image processing unit, B) the lens 5 is positioned on the optical path by means of its motorization 51, at a position C1 located a distance D1 from the center C0 of the optical path, C) the position (x,y) of the image of the convergent beam formed on the sensor 6 is determined, D) the two positions are compared to a preset threshold, E) provided that this threshold is not reached, steps B) to D) are reiterated for a new position C2 of the lens 5, located a smaller distance D2 from the center C0 (D2<D1), a new image position being associated with this new lens position.

F) the lens 5 is considered to be correctly centered once this threshold is reached. This threshold is typically equal to 0 or about 0.

The positions are compared, for example, by comparing the intensity barycenters of the pixels of the images, or by comparing the intensity or energy distributions of the images E11 (x,y) and E12(x,y), etc.

Once the operation of centering the lens 5 has been completed, the sensor 6 is piloted so that it is positioned, on the optical path, as close as possible (to within its digital resolution) to the image focal plane of the imaging lens 5, by seeking the minimum diameter (or another optimal characteristic) of the images formed on the sensor as a function of the position of the latter. More precisely:

A) the sensor 6 being positioned at a position P1, by means of its motorization 61, the diameter $\Phi 1$ of the image of the beam is measured, by means of the image processing unit, B) then the sensor 6 being positioned at a position P2, the diameter $\Phi 2$ of the image of the beam is measured, C) $|\Phi 1 - \Phi 2|$ is calculated and compared to a preset threshold, D) provided that this threshold is not reached, steps B) to C) are reiterated for a new position P2 of the sensor, with which a new diameter $\Phi 2$ is associated, E) once this threshold, typically equal to 0 or about 0, is reached, the sensor 6 is placed in a position midway between P1 and P2, this position defining that of the image focal point of the lens 5.

As indicated above, apart from comparing the diameters $\Phi 1$, $\Phi 2$, other methods for comparing characteristics may be used for this adjustment: for example direct comparison of the intensity or energy distributions of the images formed on the sensor, etc.

Regarding automatic synchronization of image capture by the image sensor 6, the sensor is connected to an electronic unit for synchronizing the image capture with the laser emission, and also to an electronic unit for adjusting its aperture and/or its gain. The synchronization signal used by the electronic unit is generated by a judiciously placed photodiode 7 (for example placed in the thermal joule meter 8) that detects the laser emission; this electronic unit is also piloted by the software interface. The photodiode, which is therefore a fast photodiode, is calibrated in absolute energy relative to the heat sink 8.

More precisely, to do this an electronic unit for adjusting the aperture and/or gain of the sensor 6 depending on the peak power of the pulsed laser is used. The electronic units for controlling motorization, synchronization and gain and aperture adjustment are here integrated into the electronic unit 101 connected to the software interface 102.

The period separating 2 laser pulses and the average width (length) of these pulses is measured by means of the photodiode 7 and the software interface 102. Image capture by the sensor 6, for the spatial analysis of the intensity distribution, controlled by the synchronization electronic unit 101, is then based on 2 pulses: detection by the photodiode 7 of a first pulse, and knowledge of the period separating this pulse from the following pulse, make it possible to trigger an image capture synchronized with the second pulse. It is then possible, by means of the software interface 102, to pilot, via the adjusting electronic unit 101, the shutter time of the sensor 6 depending on the width of the pulses, and preferably, also depending on the peak power of the beam (with a very small sample of the beam, of the order of $10^{-8}$ to $10^{-9}$) detected by the sensor 6, in order to obtain an unsaturated signal level. Specifically, a saturated signal would be unusable.

In the case of a CCD sensor 6, when this automatic synchronization is carried out, the gain of the CCD sensor is optionally automatically adjusted, pulse by pulse, until a signal level that is unsaturated, but near the maximum admissible format, is obtained. The software interface 102, which is programmed to automatically pilot gain, receives the signal level on the CCD sensor as input.

This autonomous synchronization may be used to analyze the beam by capturing an image at a chosen moment during the length of a pulse and/or at a cadence compatible with the frequency of these pulses in order to store images of all the pulses in a train with a frequency as high as a few tens of hertz (i.e. a few tens of images per second): it also enables temporal analysis of pulses and pulse trains.

In one embodiment of the invention, the heat sink 8 (also designated the thermal joule meter) which may absorb more than 99.995% of the energy or average power of the beam, is used to measure the absolute energy and power of the laser over a prolonged laser exposure time, of about 1 mn for example; advantageously, during these measurements a shutter is judiciously placed on the motorized axis of the imaging lens 5 to protect the sensor 6 from this prolonged laser exposure. Specifically, even if the image sensor were closed, this exposure (1 mn), which is longer than the normal average exposure (<1 s), could damage it. The thermal joule meter is used to calibrate, in absolute energy, the synchronization photodiode 7, which may thus take absolute measurements of spatial energy distribution, these measurements being compatible with the frequency of the pulses.

Thus, in the location of the part to be processed (and not in a sample of the beam), a complete and absolute analysis is obtained of the characteristics of the focused beam actually used: spatial intensity distribution, diameter in the focal plane or along its path either side of the focal plane (i.e. its caustic focus), temporal profile, frequency and length of the pulses, energy and peak power of the pulses, and average power.

Knowledge of the variation over time of the spatial distribution of the intensity in a section of the beam or at the focal point is particularly useful in industrial applications such as aeronautical drilling for example.

The invention claimed is:

1. An analyzer for analyzing a spatial intensity distribution of a focused pulsed laser beam in a focal plane, comprising downstream of said focal plane and on an optical path:
   a shaping lens,
   a device for partially sampling a shaped beam from the shaping lens,
   a heat sink intended to absorb the unsampled beam,
   a photodiode placed in the heat sink, and
   an imaging lens configured to form images of the focal plane on an image sensor;
   the analyzer further comprising:
   a motorization of the shaping lens to translate the shaping lens along an axis of the optical path, a motorization of the imaging lens to translate the imaging lens in a plane perpendicular to the axis of the optical path, a motorization of the image sensor to translate the sensor along the axis of the optical path, an electronic unit for controlling each said motorization, and an electronic unit for synchronizing the image sensor, said electronic unit is connected to the photodiode and is configured to synchronize an image capture with laser pulses or in the laser pulses of the focused pulsed laser beam, an electronic unit for adjusting an aperture and/or a gain of the image sensor, and a software interface for parameterizing and piloting controlling, synchronizing and adjusting carried out by the respective electronic units.

2. The analyzer of claim 1, wherein the photodiode is calibrated in absolute energy relative to the heat sink.

3. A method for analyzing the spatial intensity distribution of a laser beam by means of an analyzer as claimed in claim 1, comprising:

measuring, by the photodiode and the software interface, a period separating two pulses and an average length of the two pulses, triggering the image capture by the sensor with the electronic unit that synchronizes as a function of the period and the average length, and measuring the spatial intensity distribution of the one or more captured images.

4. The analyzing method as claimed in claim 3, wherein the image capture is triggered at a chosen moment during the average length of the pulse.

5. The analyzing method as claimed in claim 3, further comprising calibrating the photodiode in absolute energy relative to the heat sink.

* * * * *